United States Patent [19]

Griffith et al.

[11] 4,415,812

[45] Nov. 15, 1983

[54] ELECTRIC STARTING SYSTEM

[75] Inventors: Donald B. Griffith, Markleville; Timothy C. Alexander, Anderson, both of Ind.

[73] Assignee: General Motors Corporation, Detroit, Mich.

[21] Appl. No.: 338,639

[22] Filed: Jan. 11, 1982

[51] Int. Cl.[3] .......................... B23K 9/10; B60K 15/00; H02P 9/04; F02N 11/08

[52] U.S. Cl. .......................... 290/38 R; 290/31; 290/38 E; 290/38 C; 318/284; 318/285

[58] Field of Search .......................... 290/31, 36 R, 38 R, 290/38 C, 38 E, 48, DIG. 1, DIG. 3, DIG. 11; 318/284, 285

[56] References Cited

U.S. PATENT DOCUMENTS

| | | | |
|---|---|---|---|
| Re. 30,686 | 7/1981 | Budher | 290/38 C X |
| 882,687 | 3/1908 | James | 318/284 |
| 967,133 | 8/1910 | Keefer | 318/284 |
| 1,475,854 | 11/1923 | Murdock | 318/284 |
| 2,016,417 | 10/1935 | Dyer | 290/36 R |
| 2,112,059 | 3/1938 | Arthur | 200/83 T |
| 3,857,043 | 12/1974 | Habasch | 290/38 R |
| 3,863,077 | 1/1975 | Bienkowski | 290/38 R |
| 4,032,792 | 6/1977 | Parkyn et al. | 290/38 R X |
| 4,070,585 | 1/1978 | Parkyn | 290/38 R X |
| 4,227,588 | 10/1980 | Biancardi | 290/38 E X |
| 4,286,683 | 9/1981 | Zeigner et al. | 290/38 E X |
| 4,293,756 | 10/1981 | Hoyt, Jr. et al. | 290/31 X |

*Primary Examiner*—J. V. Truhe
*Assistant Examiner*—Terrance L. Flower
*Attorney, Agent, or Firm*—C. R. Meland

[57] ABSTRACT

An electric starting system for cranking an internal combustion engine by an electric cranking motor. The system prevents energization of the cranking motor following initial energization and subsequent deenergization by sensing the voltage generated by the cranking motor when it is deenergized and preventing reenergization of the cranking motor until this voltage drops to some value indicative of a low cranking motor speed.

5 Claims, 1 Drawing Figure

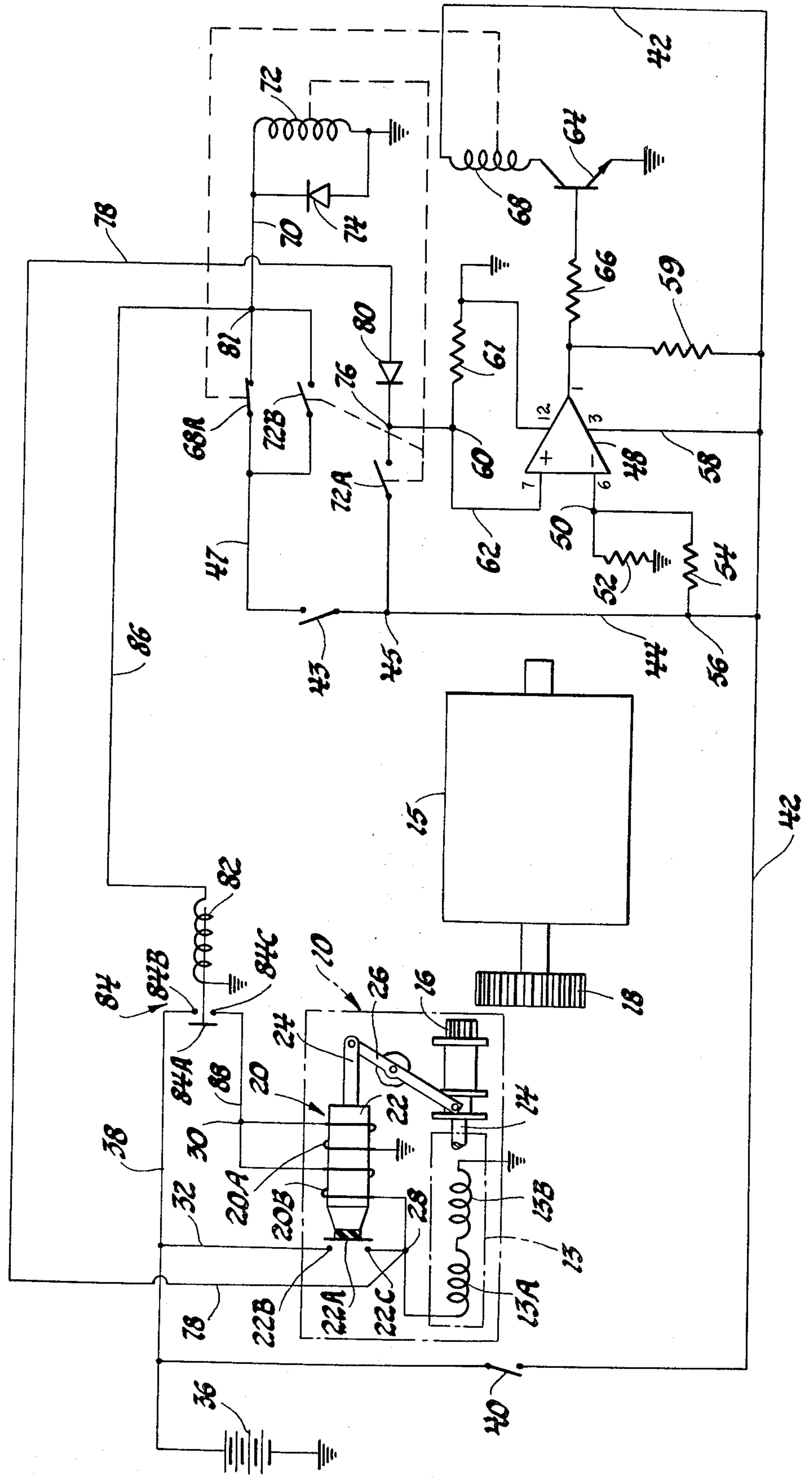
42
72
64
68
74
70
78
66
59
80
81
61
76
68A
72B
12
1
3
60
7
6
48
58
72A
50
62
47
52
54
86
43
45
44
56
15
42
82
84
84B
84C
10
26
16
18
84A
88
20
24
22
14
30
38
20A
20B
13B
32
28
13
22B
22A
22C
13A
78
36
40

ELECTRIC STARTING SYSTEM

This invention relates to an electric starting system for controlling the energization of an electric starter that is used to crank a combustion engine.

When using an electric starter to crank an engine a pinion driven by the electric cranking motor is meshed with the ring gear of the engine when the starter is energized to crank the engine. In the event that the operator of the cranking system initially energizes the starter, deenergizes the starter and then immediately reenergizes the starter, the armature of the cranking motor, the pinion it drives and the ring gear of the engine may all be rotating at the time the starter is reenergized with the result that remeshing of the pinion with the ring gear may cause serious damage to the pinion of the starter and to other parts of the starter.

In order to prevent a reengagement of the pinion with the ring gear of the engine while the cranking motor armature may still be rotating from initial energization it has been proposed to provide time delay arrangements that for a given period of time prevent energization of the cranking motor after initial energization and deenergization.

In contrast to time delay methods of controlling cranking motor energization it is an object of this invention to provide a starting motor system that prevents energization of the cranking motor following initial energization and deenergization by sensing the voltage generated in the cranking motor due to residual magnetism when it is deenergized and providing a voltage responsive means that responds to this generated voltage to prevent reenergization of the cranking motor until this generated voltage drops to some value. The voltage generated by the cranking motor when it is deenergized is a function of cranking motor armature speed and decreases as the cranking motor coasts to a stop. Thus, by utilizing this voltage it is possible to positively detect the rotational speed of the armature of the cranking motor so as to prevent motor energization when the cranking motor armature is rotating at such a speed as to cause damage to the cranking motor and/or pinion if it were meshed to the ring gear of the engine.

IN THE DRAWINGS

The single FIGURE drawing is a schematic circuit diagram of an electric cranking motor system made in accordance with this invention.

Referring now to the drawing, the reference numeral 10 generally designates an electric starter for cranking an internal combustion engine 15. The starter 10 includes an electric cranking motor 13 having a field winding 13A and a rotatable armature carrying an armature winding 13B connected in series with field winding 13A. The armature is mechanically coupled to a motor shaft 14 which drives starter pinion 16. The pinion 16 is adapted to be meshed with the ring gear 18 of the engine 15. To this end the cranking motor includes the usual solenoid 20 having an armature 22 coupled to a link 24. The link 24 is coupled to pivot arm 26 which in turn can move the pinion 16 into or out of mesh with the ring gear 18 when the armature 22 is shifted, all of which is well known to those skilled in the art. The drive between the shaft 14 and the pinion 16 includes an overrunning clutch of any well known construction which has not been illustrated.

The solenoid 20 has a pull-in coil 20A, one end of which is grounded. The solenoid further includes a hold-in coil 20B, one end of which is electrically connected to motor input terminal 28. The coils 20A and 20B are connected to a junction 30. The armature 22 operates an electrical contact 22A which engages fixed contacts 22B and 22C when the solenoid coils are energized to shift the armature 22. The fixed contact 22C is connected to the motor input terminal 28 whereas the fixed contact 22B is connected to a conductor 32.

The starting motor system is intended for use on a motor vehicle and the electrical system of the vehicle includes a battery 36, one end of which is grounded and the other end of which is connected to a conductor 38. The battery 36 is charged from a generator driven by the engine which has not been illustrated. The system may be a 24 volt system in which case the battery 36 is a 24 volt battery.

The starting system of this invention includes an ignition switch designated by reference numeral 40 and a start switch 43. The switch 40 is manually closed by the operator to place the system in a condition of operation such that manual operation of the start switch 43 controls energization of the starter. The switch 40 is connected between conductor 38 and a conductor 42. The conductor 42 in turn is connected to a conductor 44 so that when the switch 40 is closed positive battery voltage is applied to conductor 44. The start switch 43 is connected between junction 45 and conductor 47.

The switching arrangement for preventing a reenergization of the cranking motor until the voltage generated therein drops to some value includes a voltage comparator designated by reference numeral 48. This comparator may take various forms and may be, for example, a National Semiconductor type LM 139A integrated circuit comparator or equivalent. The numerals adjacent the comparator indicate the terminal pins of an LM 139A device.

The negative terminal of the voltage comparator 48 is connected to a junction 59 which in turn is connected between resistors 52 and 54. The resistors 54 and 52 are series connected between junction 56 and ground so that when a positive voltage is applied to conductor 42 a low voltage very near ground potential is produced at junction 50 and applied to the negative terminal of the voltage comparator 48. This voltage is a reference voltage and is compared to the generated voltage of motor 13 when it is deenergized as will be more fully described hereinafter. The resistor 54 may be, for example, 22,000 ohms and the resistor 52 approximately 15 ohms to provide the low reference voltage at junction 50 which is very near ground potential. Assuming a source voltage (battery 36) of 24 volts the potential at junction 50 would be of the order of 0.016 volts and would go lower if source voltage decreases.

The number 3 terminal of the comparator 48 is connected to conductor 42 via line 58 whereas the number 12 terminal of the comparator is connected to ground. The positive input terminal of the comparator 48 is connected to a junction 60 via conductor 62 and the voltage applied to this input terminal, as will be more fully described hereinafter, is a function of the voltage generated by the cranking motor when it is deenergized. A resistor 61 is connected between junction 60 and ground. The output of the comparator 48, which is at terminal number 1, is connected to the base of an NPN transistor 64 via resistor 66. A resistor 59 is connected between conductor 42 and the comparator output terminal. The emitter of transistor 64 is grounded and its collector is connected to a relay coil 68. The opposite end of the relay coil is connected to conductor 42 so that when transistor 64 is biased conductive the relay coil 68 is energized. The relay coil 68 operates a relay contact arm 68A. The relay is arranged such that the contact arm 68A is in a normally closed position as shown when the coil 68 is deenergized. When coil 68 is energized contact 68A is moved to an open position and remains in this position as long as coil 68 is energized. The circuit controlled by relay contactor 68A is connected between conductor 47 and a conductor 70 connected to one side of a relay coil winding 72. The opposite side of the coil winding 72 is grounded as shown and a diode 74 is connected across this relay coil.

The relay coil 72 controls relay contacts 72A and 72B which are normally open contacts and thus are in an open position when relay coil 72 is not energized. The energization of relay coil 72 causes contacts 72A and 72B to shift to a closed position thereby respectively connecting conductor 47 and conductor 70 and junction 45 and a junction 76. The junction 76 is connected to the positive input terminal 7 of the voltage comparator 48 via conductor 62. The junction 76 is also connected to the motor input terminal 28 via conductor 78 and semiconductor diode 80 which may be of the silicon type. It will be appreciated that the voltage at junction 28 can be applied to the positive input terminal of the voltage comparator 48 via conductor 78, diode 80, junction 76 and conductor 62.

The voltage comparator 48 will provide an output to the base of transistor 64 biasing this transistor conductive to energize relay coil 68 whenever the voltage at the positive input terminal of the voltage comparator 48 exceeds the voltage of the negative terminal of the voltage comparator. When the voltage at the positive terminal of comparator 48 is less than the reference voltage applied to the negative terminal the comparator output is such that the transistor 64 is biased nonconductive thereby deenergizing relay coil 68.

The junction 81, which is connected between relay contact 68A and conductor 70, is connected to one side of the coil winding 82 of a magnetic switch 84 via conductor 86. The opposite side of the coil winding 82 is grounded. The magnetic switch has a movable contact 84A and fixed contacts 84B and 84C. The contactor 84A is normally biased out of engagement with the fixed contacts but when relay coil 82 is energized the contactor 84A engages fixed contacts 84B and 84C to thereby electrically connected the conductor 38 with the junction 30 via conductor 88. This energizes the coil windings of the solenoid 20 to cause the pinion 16 to mesh with the ring gear 18 and further causes the contactor 22A to engage fixed contacts 22B and 22C to thereby electrically connect the electric starting motor 13 across the voltage source 36. This, of course, initiates cranking of the engine 15.

The operation of the starting system of this invention will now be described. When the operator desires to start the engine the ignition switch 40 is closed. This applies positive battery voltage to conductors 42 and 44 and to the components connected to these conductors. If the operator now desires to crank the engine the start switch 43 is closed. The closure of the switch 40 caused the low reference potential to be developed at junction 50 which is applied to the negative input terminal of the comparator 48. Closure of start switch 43 energizes conductor 47 and since relay contactor 68A is now in its normally closed position the relay coil 72 will be energized. The energization of coil 72 causes contactors 72A and 72B to close and due to closure of contactor 72A positive battery voltage is applied to the positive input terminal of the voltage comparator 48. The closure of contactor 72B provides another energization path for relay coil 72 and, in effect, latches contactor 72B to a closed position as long as switches 40 and 43 are closed. Assuming a 24 volt system, the voltage at the positive terminal of the comparator 48 is substantially higher than the reference voltage of approximately ground potential applied to the negative terminal of the comparator and as a result the comparator biases transistor 64 conductive to thereby energize relay coil 68. The energization of relay coil 68 opens contact 68A but contacts 72A and 72B remain closed. When the start switch 43 is closed the magnetic switch coil 82 is energized from junction 81 closing contact 84A to energize the starter and commence engine cranking. The circuit for magnetic switch coil 82 is initially through normally closed contactor 68A and then through contactor 72B after contactor 68A opens. The engine is now being cranked by the starter 10 with the pinion 16 meshed with ring gear 18.

If for some reason the operator, after initially closing the start switch 43, opens the switch and then immediately recloses the switch the system will prevent energization of the starter when the switch is reclosed. Thus, the opening of the start switch 43 will deenergize the magnetic switch coil 82 since it is in series with this coil. As a result, the cranking motor is deenergized and the pinion 16 is withdrawn from mesh with the ring gear 18. Moreover, opening of switch 43 deenergizes relay coil 72 with the result that contactors 72A and 72B move to an open position. Relay coil 68 remains energized to hold contactor 68A in an open position after contactor 72A has opened to remove battery potential from the positive input terminal of comparator 48. This is due to the fact that the voltage at the input terminal 28 of motor 13 is applied to the positive terminal of comparator 48 via conductor 78, diode 80 and junction 76 and conductor 62. The comparator now is comparing the low reference voltage at junction 50 with a voltage that is generated in the armature winding 13B of the electric cranking motor 13. At this time the starter motor is disconnected from voltage source 36 and is therefore deenergized. The armature of the cranking motor, however, is rotating at some speed caused by prior energization and due to residual magnetism of the magnetic parts of the motor 13 a voltage is generated that is applied to conductor 78. As the motor armature coasts to a stop this generated voltage will decrease from some value, for example 14 volts for a 24 volt cranking motor, to zero when the motor armature comes to a complete stop. As long as the generated voltage exceeds the low reference value the comparator maintains the transistor 64 conductive and therefore relay coil 68 is energized to hold contactor 68A in an open position. Since contactor 72B is now also open the electric cranking motor cannot be energized even if start switch 43 is closed by the operator. When the generated voltage drops below a reference value transistor 64 is of course biased nonconductive thereby deenergizing relay coil 68 and permitting the contactor 68A to close which now permits the cranking motor to be energized.

The reference voltage developed at junction 50, the generated voltage of motor 13, when disconnected from battery 36 and therefore deenergized, and the circuit components are so arranged that the armature speed of the motor will be so low (near zero speed) as not to cause damage to the starter when the voltage at the positive terminal of comparator 48 (generated voltage) drops below the reference voltage (junction 50) applied to the negative terminal of the comparator. Putting it another way, the voltages are so selected that the speed of the armature has dropped to some value that will not cause damage to the starter before reenergization is permitted.

In regard to the voltage generated by the motor 13, when it is deenergized, it will be appreciated that initially the voltage developed in armature 13B will buildup due to residual magnetism of the magnetic parts of the motor and will be a function of armature speed. When the voltage has built-up there is very little current supplied to the field winding 13A since the motor, when now operating as a generator, is connected to a high impedance load including comparator 48 and the resistor 61 which is approximately 10,000 ohms.

It has been observed that with the use of the system of this invention the engine and consequently the ring gear will stop rotating before the armature of the cranking motor and pinion 16 stop rotating after an initial cranking effort and subsequent deenergization. Since the system of this invention prevents reenergization of the starter until motor armature speed is near zero and since at this time it is expected that the ring gear of the engine will have stopped rotating, damage that might otherwise be caused by an attempted reenergization of the starter is prevented.

It has been pointed out that resistor 61 is approximately 10,000 ohms. The resistors 59 and 66 are also approximately 10,000 ohms in a 24 volt system.

The ignition switch 40 is of a type which remains open or closed when shifted to a respective open or closed position by the operator. The start switch 43 can be of the momentary type, that is it moves to an open position when released by the operator. One example is a so-called push button switch which is spring biased to an open position and moves to this position when released by the operator.

The diode 80 prevents current flow from conductor 42 to conductor 78 when contactor 72A is closed.

Field winding 13A of direct current motor 13 has been illustrated as a single winding connected between motor terminal 28 and armature winding 13B. The motor may have a plurality of parallel connected field windings each connected between terminal 28 and armature winding 13B and winding 13A represents the total field of the cranking motor. The electrical connection to the armature winding is by way of a commutator and brushes which have not been illustrated.

The embodiments of the invention in which an exclusive property or privilege is claimed are defined as follows:

1. An electric starting system for cranking an engine comprising, an electric cranking motor, a voltage source, a start switch, cranking motor control means including a switching means operative in a first state to permit initial energization of the cranking motor from the voltage source when the start switch is initially closed and operative in a second state to prevent subsequent energization of the cranking motor from the voltage source when the start switch is subsequently opened and then reclosed, voltage responsive means coupled to said switching means for controlling its state of operation, means responsive to initial closure of said start switch for energizing said cranking motor and for applying a voltage to said voltage responsive means from said voltage source of such a magnitude as to cause said voltage responsive means to actuate said switching means from said first state to said second state, means disconnecting said cranking motor and voltage source when said start switch is subsequently opened, and means for applying the voltage generated in said cranking motor to said voltage responsive means when said cranking motor is disconnected from said voltage source, the magnitude of the generated voltage being such as to cause the voltage responsive means to maintain the switching means in said second state to prevent energization of the cranking motor until said generated voltage decreases to a predetermined value.

2. An electric starting system for cranking an engine comprising, a source of voltage, a start switch, an electric cranking motor, means including first and second switching means operative when either is in a conductive state to permit energization of the cranking motor from said voltage source and operative when both are in a nonconductive state to prevent energization of the cranking motor, means responsive to initial closure of said start switch for actuating said first switching means to a nonconductive state and said second switching means to a conductive state to energize said cranking motor, means responsive to subsequent opening of said start switch to deenergize said cranking motor and actuate said second switching means to its nonconductive state, and means responsive to the voltage generated in said motor while it is deenergized for maintaining said first switching means in its nonconductive state until said generated voltage decreases to some predetermined value whereby the cranking motor is prevented from being energized until said generated voltage decreases to said predetermined value.

3. An electric starting system for cranking an engine comprising, a source of voltage, a start switch, an electric cranking motor, means including first and second switching means operative when either is in a conductive state to permit energization of the cranking motor from said voltage source and operative when both are in a nonconductive state to prevent energization of the cranking motor, means responsive to initial closure of said start switch for actuating said first switching means to a nonconductive state and said second switching means to a conductive state to energize said cranking motor, said last-named means including a voltage comparator coupled to said first switching means for controlling said first switching means, means responsive to subsequent opening of said start switch to deenergize said cranking motor and actuate said second switching means to its nonconductive state, and means responsive to the voltage generated in said motor while it is deenergized for maintaining said first switching means in its nonconductive state until said generated voltage decreases to some predetermined value whereby the cranking motor is prevented from being energized until said generated voltage decreases to said predetermined value, said last-named means comprising said voltage comparator and means for applying the generated voltage to said voltage comparator.

4. An electric starting system for cranking an engine comprising, an electric cranking motor, a voltage source, a manually operable start switch, a voltage comparator having an input terminal and an output terminal, means including a cranking motor control circuit which when energized is operative to cause the cranking motor to be connected to the voltage source and when deenergized is operative to cause the cranking motor to be disconnected from the voltage source, first and second parallel connected switching means, means connecting said start switch and said first and second parallel connected switching means in series between said voltage source and said control circuit, means coupled to the output terminal of said voltage comparator controlling said first switching means, means for applying source voltage to said input terminal of said comparator when said start switch is initially closed to bias the comparator to a state wherein said first switching means is actuated to an open condition, a circuit connecting said motor to said input terminal of said comparator to apply the voltage generated in said motor to said input terminal when said motor is disconnected from said voltage source and when said input terminal is disconnected from said voltage source, the voltage generated in said motor operative to maintain the comparator biased to a state wherein said first switching means is maintained in an open condition until the generated voltage decreases to some value indicative of low cranking motor speed, and means responsive to opening of said start switch following intial closure thereof to disconnect said input terminal from said voltage source and actuate said second switching means to an open condition.

5. An electric starting system for cranking an engine comprising, an electric cranking motor, a voltage source, a manually operable start switch, first and second relay coils, said first relay coil when energized actuating normally closed first contact means to an open position and said second relay coil when energized actuating second and third normally open contact means to a closed position, magnetic switch means including an actuating coil operative when energized to connect said voltage source and cranking motor and operative when deenergized to disconnect said voltage source and cranking motor, a voltage comparator having an input terminal and an output terminal, a circuit for controlling the energization of the actuating coil of said magnetic switch connected between said voltage source and actuating coil comprising in a series connection said start switch and a circuit comprised of a parallel connection of said first and second contact means, said parallel connected contact means connected in series with said second relay coil to thereby energize said second relay coil when said start switch is initially closed, a circuit for connecting said input terminal of said voltage comparator to said voltage source comprising said third contact means, means coupling the output terminal of said voltage comparator to said first relay coil, and a circuit including a diode connecting said cranking motor to said input terminal of said voltage comparator whereby said input terminal has cranking motor generated voltage applied thereto when said magnetic switch means is opened to disconnect said cranking motor and voltage source, the generated voltage being of such a magnitude as to bias the comparator output to such a state as to maintain said first relay coil energized to thereby maintain said first contract means in an open condition until said generated voltage decreases to some predetermined value indicative of low cranking motor speed.

* * * * *